Oct. 6, 1942.  W. R. DRAY  2,297,998
SEPARATING MECHANISM FOR THRESHERS
Original Filed July 1, 1935   2 Sheets-Sheet 1

Inventor
W. R. Dray
by
Attorney

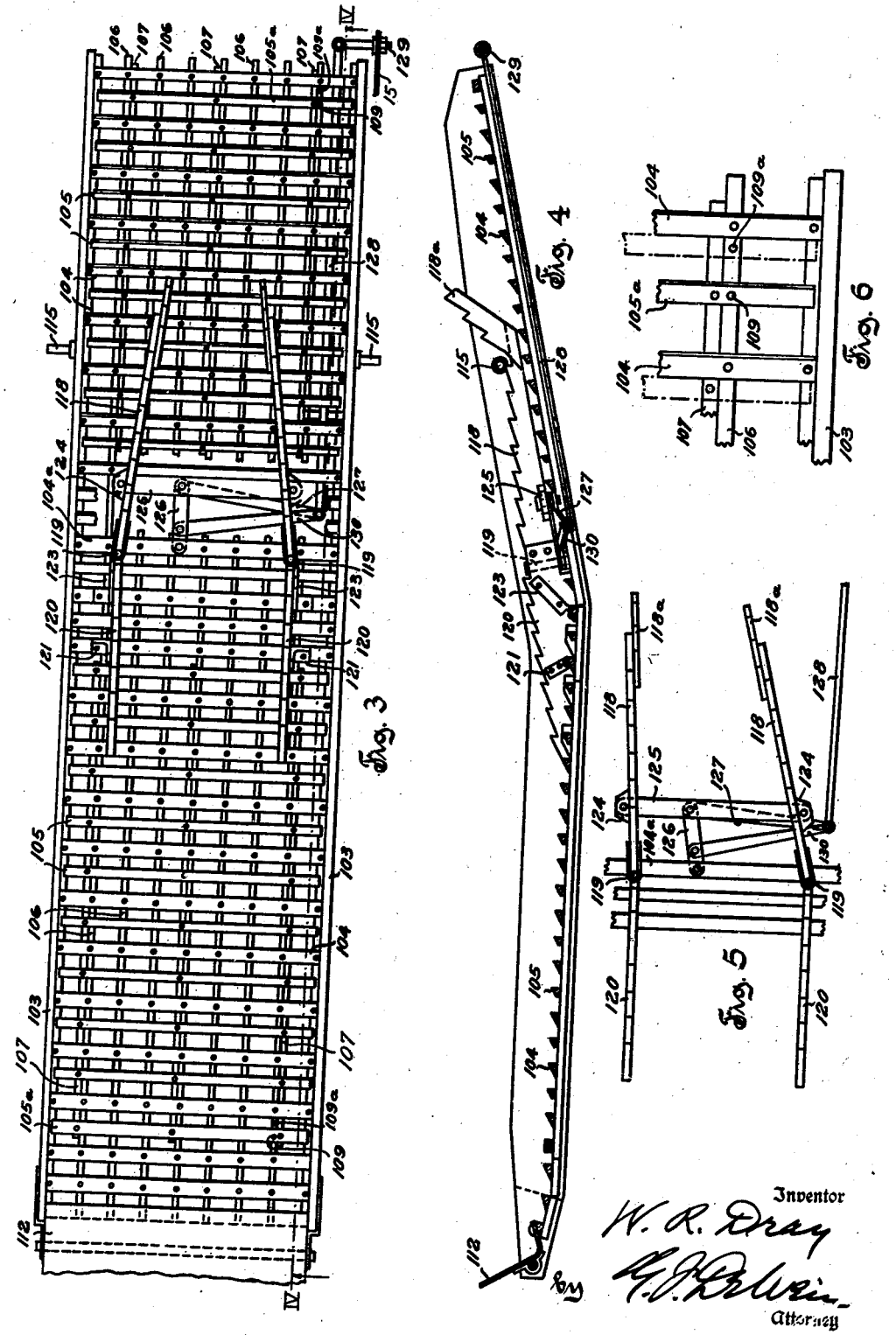

Patented Oct. 6, 1942

2,297,998

UNITED STATES PATENT OFFICE 2,297,998

SEPARATING MECHANISM FOR THRESHERS

Walter R. Dray, Kendall Township, Kendall County, Ill., assignor to Allis-Chalmers Manufacturing Company, Milwaukee, Wis., a corporation of Delaware Original application July 1, 1935, Serial No. 29,216. Divided and this application June 29, 1940, Serial No. 343,125

2 Claims. (Cl. 130—25)

This invention relates in general to improvements of utility in threshing machines, including that class thereof generally known as harvester-threshers or combines, and it has more particular relation to mechanism of utility in separating threshed grain or the like from straw or stalks during operation of the machine.

The present application is a division of applicant's copending application, Serial No. 29,216, filed July 1, 1935.

This invention contemplates and has for an object thereof the provision of an improved design and construction of separating mechanism for use in a threshing machine and embodying a novel and improved construction of straw carrier.

It is a further object of this invention to provide an improved design and construction of separating mechanism including a shaking rack embodying cooperative elements adapted to act on the straw, and one of which elements is movable transversely of the other to impart a sidewise shaking motion to the straw or stalks as it advances along the separator during normal operation of the apparatus.

These and other objects and advantages are attained by the present invention, various novel features of which will be apparent from the description and accompanying drawings, disclosing an embodiment of features of the invention, and will be more particularly pointed out in the claims.

In the accompanying drawings:

Fig. 3 is a plan view, with parts broken away, of the separating mechanism of the apparatus of Fig. 1;

Fig. 4 is a sectional view in the plane of the line IV—IV of Fig. 3;

Fig. 5 is a plan view of details of the actuating mechanism shown in Figs. 3 and 4, in an extreme position; and Fig. 6 is an enlarged plan view of a detail of Fig. 3.

Figure 1:
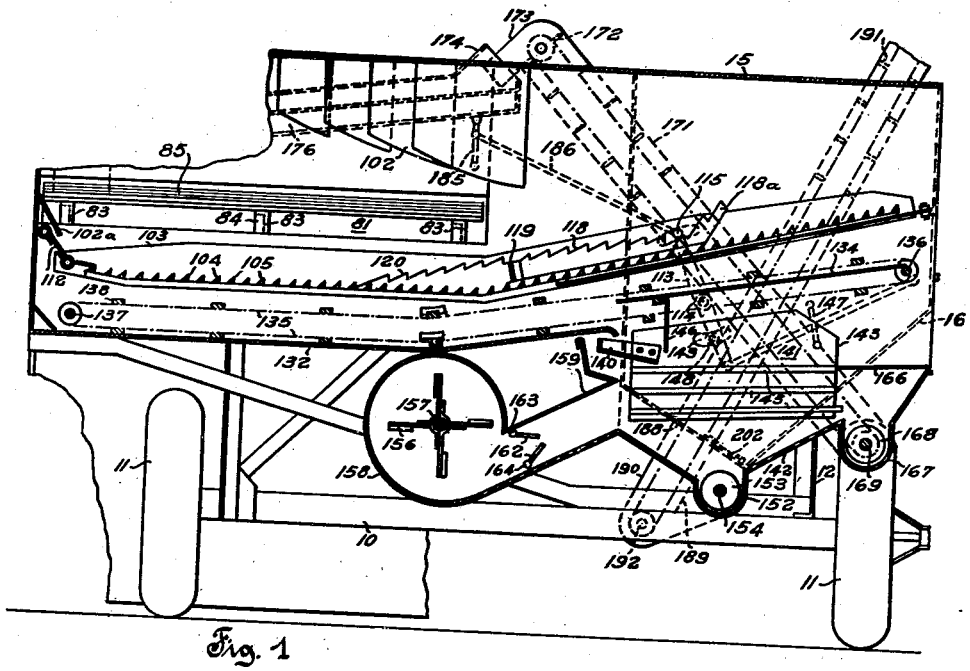
Fig. 1 is a fragmental vertical sectional view of a harvester-thresher through the separating end thereof, embodying features of the present invention.

Referring to the drawings, wherein are shown parts of a harvester-thresher apparatus, such as is disclosed in applicant's parent application mentioned hereinabove, a main support for the apparatus may be in the form of a steel tube 10 extending transversely of the normal direction of travel of the apparatus, and carrying journals for the supporting and traction wheels 11. On the support 10 is mounted a supporting framework carrying a supporting and enclosing housing for the threshing mechanism and a housing 15 for the separating mechanism, the latter communicating with the discharge side of the housing for the threshing mechanism and extending transversely thereof. A grain storage bin 16 may be mounted on the frame forwardly of the separator housing 15.

A rotatable cylinder, indicated generally at 81, comprises a plurality of spaced annular members or disks 83 with peripheral flanges thereon turned over at right angles to the planes of the disks, as indicated at 84. Secured to the peripheral flanges 84 of the disks 83 are a plurality of spaced thresher bars 85, preferably in the form of sections of angle iron, one flange portion of each bar being secured to the flanges 84 of the disks 83 and the other substantially radially extending flange portions of the thresher bars serving as the active threshing elements of the cylinder. The threshing bars of the cylinder cooperate, during rotation of the latter, with the threshing elements of a stationary concave disposed below and in relatively close proximity to the cylinder.

The stalks and the threshed grain removed therefrom by the action of the threshing mechanism are forced rearwardly, across the full width of the threshing cylinder and housing therefor, into a separator housing 15, through the adjacent wall thereof; and the straw and grain are discharged from the cylinder housing with considerable force, due to relatively high speed of the cylinder and the fan effect thereof.

In order to maintain the separating mechanism of minimum length and to insure utilization of the separating action of the latter throughout its full length, one or more guiding baffles 102 curving toward the forward end of the separator housing are shown mounted on and depending from the roof of the separator housing into the path of material projected upwardly and rearwardly from the threshing cylinder. These baffles 102 preferably extend to gradually increasing distances transversely of the separating chamber, and may be of gradually increasing height, toward the discharge end of the separator housing, in order to secure the desired baffling and guiding effect. The material discharged from the cylinder housing strikes these baffles and is guided thereby toward the forward end of the separator housing and drops down on the adjacent end portion of the separating mechanism, permitting utilization of the separating action of the latter on the straw throughout the full length of the separator.

The forward end wall of the separating housing 15 may be provided with a transversely extending baffle 102a extending across substantially the full portion of the width of the housing and extending downwardly at an angle. This baffle 102a serves to deflect onto the forward end of the separating mechanism grain and straw particles projected against the forward end wall, thus preventing pieces of straw from passing downwardly between the end of the rack and the adjacent wall of the separator housing. This baffle 102 may be mounted on a portion of this end wall which is hinged or otherwise removably secured in position, so as to permit, on removal of the detachable portion, inspection of the rack and discharge portions of the threshing cylinder housing.

The separator housing 15 is provided with devices for shaking the straw and recovering threshed grain therefrom, these devices including a straw shaking rack extending the full length and approximately the full width of the separator housing. The straw rack includes a frame 103, comprising longitudinal side members and connecting bars at the ends thereof, and is of dimensions approximating the inner dimensions of the separator housing.

This rack is provided with a series of spaced slats extending transversely of the length of the housing and carried by the frame 103. As indicated, these slats are arranged in two series, the slats 104 of one series alternating with the slats 105 of a second series. The slats of the first series are secured to one or another set of spaced longitudinally extending tie bars 106, each set corresponding in position to one of two relatively inclined sections of the rack and are connected at suitable intervals to flanges or projections on the inner side walls of the frame 103, so that these slats, with their tie bars or rods 106, constitute a unitary structure with the frame 103. Slats 105 of the second series may be of somewhat smaller cross section than the slats 104 and are mounted on one or the other series of parallel tie bars 107, the slats of this second series, with the two sets of longitudinally extending bars 107 constituting two slatted frames assembled with the slats 105 disposed in spaces between adjacent slats 104 of the first series and secured to the longitudinal tie bars 107 and resting on the upper sides of the tie bars 106 of the first series of slats.

With this arrangement, it will be apparent that the slats 105 of each of the second series of slats may be moved as a unit relative to the slats 104 of the first series. The desired normal position of the two series of slats is such that slats 105 occupy positions in the middle of the spaces between adjacent slats 104 of the first series, thus providing openings of the same size between the slats of the two series throughout, this arrangement being satisfactory for handling the straw or stalks of most crops.

The several series of slats 104 and 105 may be held in the above described adjusted position by securing one or more slats 105a of both sets of this series to one or more of the tie rods 107 of the other series of slats by means of one or more removable pins or screws 109, as indicated.

While it is desirable to have relatively small openings between adjacent slats of the rack and thus avoid having pieces of straw pass through the rack along with the grain, still, in handling certain crops, particularly such as have relatively large stalks, portions of these stalks are likely to enter the spaces between adjacent slats and to become wedged therein, thus impeding the free flow or advance of straw along the rack and the passage of threshed grain through the openings in the rack. On removal of the securing pins or screws 109, the frames made up of the slats 105 and tie rods 107 may be moved as units to bring the slats 105 toward and into engagement with adjacent slats 104, in which position they may be secured, with the securing pins or screws 109 passing through holes 109a in the tie rods 106, thus providing approximately one-half as many openings through the rack as are indicated in Fig. 3, but these openings being of considerably greater size, thus avoiding any clogging that might result from large stalks that might otherwise become wedged in the smaller openings of the rack.

As indicated, the slats 105 may be omitted at a point intermediate the length of the rack adjacent the intersection of the two relatively inclined sections thereof and also adjacent the forward end of the rack, where this end of the frame is inclined upwardly from the body portion of the rack. At these points, the fixed slats 104 which are definitely positioned with respect to the frame are spaced apart the same distance as the normal spacing of the slats 104 and 105 throughout the body portion of such rack, as indicated in Fig. 3.

The rack is mounted in operative position to provide for the desired oscillating or shaking motion through a link or set of links 112 pivoted to the forward end of the frame 103 and the end wall of the separator housing, and through oscillating shaking arms or levers 113, one at each side of the separator housing, mounted on journal pins 114 carried by the housing. The upper ends of these shaking levers 113 are connected to pins 115 on the outer side walls of the frame 103 and passing through arcuate slots 116 in the side walls of the housing. With the rack mounted or swung on the rear supporting links 112 and the upper ends of the shaking arms 113, the rack as a whole is given the desired vibrating or shaking motion through oscillation of the shaking arms 113.

In order to augment the normal separating action of the straw rack, auxiliary shaking devices are provided, in the form of a plurality of longitudinally extending and spaced shaker arms 118, these arms being disposed above and adjacent the upper surface of the rack slats, and preferably slightly spaced from the latter, the upper edges of these arms being serrated in such fashion as to assist in advancing any straw resting thereon toward the discharge end of the separator housing, and the arms being inclined toward each other in the direction of travel of the straw. The discharge ends of the shaker arms are preferably provided with upwardly extending tail like projections 118a, the raised discharge ends of these projections being considerably spaced from the body of the straw rack so that as the straw is moved over these extensions, it is free to drop through space onto the body of the rack.

These shaker arms 118 have a lateral motion across the rack about pivotal points, in a fashion corresponding to the movement of a fish's tail. As indicated, the shaker arms are pivoted or hinged, as indicated at 119, to the forward edges of bars or arms 120 secured to certain of the transverse slats or bars 104 carried by the rack frame, as by angle irons 121, 123 secured to a side wall of each bar 120 and to a slat or bar 104 of the rack. The upper edges of these bars 120 are inclined upwardly gradually from the level of the upper surfaces of the rack slats to the level of the rear edge of the upper surface of the shaker arms 118. While each of the shaker arms 118 has its own motion about its pivotal point 119, the two arms are secured together for common movement. This attachment may be through brackets 124 secured to the side of each arm and having a flat plate at its lower side, to each of which at the under side thereof a connecting bar 125 is pivotally attached.

The desired sidewise oscillation of the shaker arms 118 is secured through a linkage utilizing the shaking motion of the rack itself as a power source. A link 126 is pivotally connected to an intermediate point on the connecting bar 125 and to a slat or cross bar 104a of the rack. A link 127 is pivotally connected at one end to the end of the link 126 attached to connecting bar 125 and at its other end to the inner end of a rod 128 extending longitudinally beneath the rack to the discharge end thereof, the other end of the rod 128 being fixed in position as by being attached to a pin 129 definitely secured to the side wall of the separator housing 15. Another link 130 is secured at one end to an intermediate point of the link 126 and at its other end to the inner end of the rod 128.

As the rack receives oscillating movement longitudinally of its length, the arms 118, the connecting bar 125 and the slat 104a partake of this same movement. However, due to the fact that the inner end of the rod 128 is fixed against longitudinal movement, the ends of the links 127 and 130 which are attached to the rod 128 must remain fixed against longitudinal movement, and the incidental angular motion of the links 127 and 130 about the end of the rod 128 causes the link 126 to move angularly about its point of attachment to the slat 104a. This angular motion of the link 126 causes the connecting bar 125 to move in the general direction of its length and relative to the rack, and thus to oscillate the shaker arms 118 transversely across the rack, in addition to partaking of the normal oscillatory movement of the rack. The required transverse movement of the inner end of the rod 128 to which the links 127 and 130 are attached, may be provided through limited pivotal movement of such rod on its pin 129, or merely through resilience of the rod 128 which is held in position only at its outer end.

In the normal operation of the apparatus, straw and grain threshed therefrom, through the action of the threshing mechanism, are fed or blown by the latter into the separator housing, being deposited upon the forward end thereof. Through the normal shaking action of the rack, this straw and grain are advanced rearwardly along the rack, that is, in the direction of discharge from the separator housing, the grain, along with relatively short pieces of straw falling through the spaces between the rack slats as the straw is advanced. The straw advancing along the rack through the normal oscillatory movement thereof, or at least the greater portion of the straw, will advance or ride upon the serrated upper edges of the supporting bars 120 and the pivoted shaker arms or fish-tails 118. Through this riding up and advancement of the straw along the shaker arms there is less tendency toward matting down of the straw on the rack in such a manner as to impede the passage of threshed grain or seeds through the straw. Further, in addition to lifting the straw mass and rendering it less dense, these shaker arms, through their independent oscillating movement very effectively break up and agitate the straw masses so as to insure a maximum removal and recovery of grain. The straw continues to advance over the pivoted shaker arms and the rack and to the discharge end of the rack, and it is forced over the discharge end directly into the field or is conveyed through a suitable rigid or flexible conveyer to a desired point of discharge.

During operation of the straw rack, threshed grain and some chaff dropping through the spaces between the slats 104, 105, fall onto the bottom plate 132 of the separator housing, and onto a plate 134 secured to the side walls of the housing adjacent the discharge end thereof. A grain drag or rake 135 of conventional design is provided within the separator housing below the straw rack, this drag or rake including a pair of endless chains one at each side of the housing and passing over driving sprockets on a driving shaft 136 and over sprockets at the front end of the housing mounted on a shaft 137, with spaced transverse raking bars 138 extending between and connecting the chains.

The sprockets for the grain drag are so disposed relative to the bottom wall 132 of the separator housing and the plate 134 that the upper course of the drag brushes over the upper surface of the plate 134 and the lower course of the drag brushes over the upper surface of the bottom wall 132 of the housing. Hence, grain falling on the plate 134 is carried forwardly along the plate by the movement of the grain drag and drops off the forward edge of the plate, all or a portion falling onto the rear edge of the bottom wall 132 of the housing. And all of the grain falling onto the bottom wall 132 of the housing is carried by the drag to the rear edge of the bottom wall where it is brushed off into a discharge pan or chute 140 whence it is free to discharge by gravity to a fanning or cleaning device 141.

The cleaning device 141 may be of the fanning mill type and is disposed in a housing 142 depending from the separator housing and open to the latter housing below the plate 134. The cleaning device comprises a frame 143 in which is mounted a plurality of superposed and spaced and preferably removable screens 145 whose normal position is such that the discharge ends of the screens are inclined upwardly to a slight extent from the horizontal plane. Grain and short pieces of straw passing through the rack flow from the discharge chute 140 onto the forward portion of the upper screen, a depending baffle 146 mounted at the under side of the plate 134 being disposed beyond the discharge end of the chute 140 to prevent material from being blown or thrown toward the discharge end of the screen.

The cleaning device is suspended through one or more links 147 pivotally attached to the rear portion of the frame 143 and the side walls of the housing and pins 148 on the sides of the frame passing through arcuate slots 149 in the housing and pivotally mounted in bearing portions 150 on the shaking arms or levers 113. As the shaking arms 113 oscillate during operation, this oscillatory or shaking motion is imparted, through the pins 148, to the cleaning device and the screens thereof. Through the shaking motion of the screens, threshed grain passes through one after another of the superposed screens, falling onto the bottom wall of the housing 142, the latter constituting a grain receiving pan having portions sloping downwardly toward the center to a well 152 which constitutes the casing or housing for a transversely extending screw conveyer 153.

Ventilating means are provided for assisting in the separating and cleaning action of the cleaning device. This ventilating or air supplying means includes a fan 156 of conventional form mounted on a shaft 157 and disposed within a casing 158 integral with or carried by the separator housing. The inlet to the fan is in an axial direction, i. e., through the ends of the casing, and the discharge is substantially tangential through a conduit or passage 159, preferably of substantially rectangular cross section, discharging into the housing 142 of the cleaning device at the forward ends of the screens. The discharge from the fan is controllable as to volume of air passed therethrough by a valve device disposed in the discharge passage. This valve device is in the form of two complementary wickets or leaves 162 fixed on operating shafts or spindles 163, 164 adjacent the upper and lower edges of the passage. These wicket valve sections 162 are preferably of the design disclosed and described in the hereinabove mentioned parent application; and in closed position they lie in substantially the same plane transversely of the discharge passage. The two wickets may be actuated simultaneously to desired position, to provide any desired degree of opening therethrough, through meshing gear segments 163a and 164a on the shafts 163 and 164 and a suitable common actuating lever.

During the operation of the apparatus and under the effect of the shaking motion of the cleaning screens and the current of air discharged by the fan 156 across the screens, dust and dirt are blown away through the discharge from the separator housing, and the clean grain passes through the screens. The larger particles of straw and unthreshed grain heads pass over the rake 166 extending from the rear edge of the upper shaking screen to the discharge from the separator housing. Most of the unthreshed or partly threshed heads are recovered by reason of these heavier particles dropping through the tines of and from the rake into the housing 167 of the screw conveyer 168 having an operating shaft 169, the lighter straw particles and chaff being carried, through the shaking motion and under the influence of the air blast, to the discharge from the separator housing.

As the threshed grain drops through the several superposed screens, the shaking action thereof, in conjunction with the air blast, is effective to carry any grain bearing tailings over the rear edge of the screens whence they drop into the casing of conveyer 168.

The opposite end of the conveyer housing 167 communicates, at the farther side of the separator housing, with the housing 171 of an inclined bucket elevator or conveyer 172, in the form of a flexible belt or chain passing over a driving pulley or sprocket mounted on the end of the shaft 169 of the conveyer 168 and over a sprocket or pulley mounted at the upper end of the elevator housing 171.

The upper end of the elevator housing is provided with a discharge spout 173 which discharges material to the feed inlet 174 of a secondary cleaning device comprising a longitudinally extending housing in front of the separator housing. The secondary cleaner, or recleaner, is mounted on oscillating links, indicated at 185, so as to permit shaking the recleaner device by a pitman rod 186 connected to a link 185 and the shaking lever 113, at the connection 115.

The grain falling into the housing 152 of the conveyer 153 is conveyed by the latter and through an extension 187 of the housing 152, this extension being formed beneath or integral with the inclined bottom wall 188 of the grain receiving bin 16. At its discharge end, this conveyer housing 187 communicates with the lower end of the housing 189 of a bucket or like elevating conveyer 191, the communicating portion of the housing 187, indicated at 190, being disposed at the forward edge of the bin 16 and supported by the bottom of the bin. The body portion of the conveyer housing is preferably arranged within and supported by the bin, and the upper end of the housing of the elevating conveyer is preferably provided with a suitable spout arrangement for discharging the grain to the bin or other receptacle. This conveyer is actuated by a driving shaft 192.

Power for operating the various mechanisms of the apparatus may be derived from a power source or shaft suitably supported on the frame and which may be connected in driving relation to the shaft 154 of the screw conveyer 153.

Figure 2:
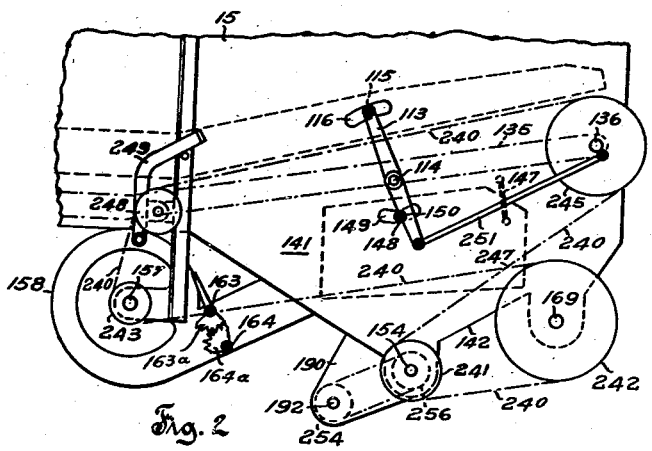
Fig. 2 is a fragmental view in elevation of a portion of the apparatus of Fig. 1.

Power is supplied from the rear end of the shaft 154, through a drive, indicated in Fig. 2, including a V-belt 240 cooperating with a V-pulley 241 on the shaft 154, a V-pulley 242 on the shaft 169 of the conveyer 168, a V-pulley 243 on the shaft 157 of the fan 156 and a V-pulley 245 on the driving shaft 136 of the grain drag 135, this driving connection serving to drive the conveyer 168 and the driving pulley or sprocket of the elevating conveyer 172, the fan 156, and the grain drag, all in the desired direction of rotation, with but one crossing turn, indicated at 247, of the belt. An adjustable idler pulley 248 is mounted on the side wall of the separator housing and serves to establish the desired driving tension on the belt 240; and through an operating lever 249 on which the shaft of idler pulley 248 is mounted, the tension of the belt may be adjusted or wholly relieved, as when the apparatus is to be out of operation for some time, or when it is desired to use the elevating conveyer 191 merely for the purpose of emptying the grain bin to a side wagon.

The shaft 136 is provided at each end thereof with an eccentric connection to pitmans 251, one at each side of the separator housing, the other end of these pitmans being connected to the lower ends of the shaker arms 113 which impart the desired shaking movement to the grain rack and the cleaning device 141, and, through the pitman rod 186, to the secondary cleaner. The sheave 245 may be used as a portion of one of these eccentric connections to the adjacent pitman 251.

The elevating conveyer 191 in the grain bin is driven by a V-pulley or sprocket 254 on the driving shaft 192 of the conveyer and drivingly connected to a corresponding pulley or sprocket 256 on the forward end of the drive shaft 154.

The diameters of the various driving and driven pulleys are so selected as to give the desired normal speeds of rotation to the driven shafts. Further adjustment of the speeds of the individual driven shafts may be secured through the use of V-groove pulleys of known design wherein provisions are made for adjusting the width of the space between the side walls of the belt groove, thus permitting the driving belt to sink to variable distances in the groove and thereby providing at will a considerable range of effective pitch diameters of the sheaves.

It should be understood that features and operating effects of the invention disclosed hereinabove have definite commercial applications and utility other than in the particular apparatus described or in the specific combinations with various other features defined in the claims, and the invention is to be considered as embracive of these various applications and utilities. And it is not desired that the invention be limited to the exact details of construction shown and described herein for obvious modifications may occur to persons skilled in the art.

It is claimed and desired to secure by Letters Patent:

1. In a harvester-thresher, a separator mechanism comprising a shaking straw carrying rack having a portion disposed in position to receive material after discharge thereof from a threshing mechanism and having a to and fro motion for advancing said material along the rack, said rack comprising a plurality of spaced transversely extending bars distributed along the length of said rack, a pair of spaced bars mounted in position on said rack and extending in the direction of advance of material thereon and with the lower edge of said spaced bars adjacent the upper face of a portion of said transverse bars of the rack, said pair of bars being of gradually increasing height toward the rear end thereof, an arm pivotally mounted on an axis extending substantially perpendicular to the upper face of the rack adjacent the rear end of each of said longitudinally extending bars and extending in substantial prolongation thereof toward the discharge end of said rack, said arms and said bars partaking of the to and fro motion of said rack, and the upper faces of said bars and arms being serrated to advance material thereon toward the rear end of said rack during to and fro motion thereof along with said rack, and means for oscillating said pivoted arms transversely of the general direction of travel of said material along said rack during their to and fro motion with said rack.

2. In a harvester-thresher, a separator mechanism comprising a shaking straw carrying rack having a portion disposed in position to receive material after discharge thereof from a threshing mechanism and having a to and fro motion for advancing said material along the rack, said rack comprising a plurality of spaced transversely extending bars distributed along the length of said rack, a pair of spaced elements mounted in position on the upper side of said rack and extending in the direction of advance of material thereon and with the lower edge of said spaced elements adjacent the upper face of a portion of said transverse bars of the rack, said pair of spaced elements being of gradually increasing height at their forward portion from the forward end thereof toward the rear end thereof, each of said spaced elements comprising a pivotally mounted arm having its pivotal axis adjacent its forward end, with said axis extending substantially perpendicular to the upper face of said rack, said spaced elements partaking of the to and fro motion of said rack, and the upper faces of said elements being serrated throughout substantially the full length thereof to advance material thereon toward the rear end of said rack during to and fro motion thereof along with said rack, and means for oscillating said pivoted arms transversely of the general direction of travel of said material along said rack during their to and fro motion with said rack.

WALTER R. DRAY.